July 29, 1924.  1,503,409
S. S. WILSON
PROCESS OF MANUFACTURING TILES, SHEETS, AND OTHER ARTICLES OR PRODUCTS FROM ASBESTOS OR LIKE MATERIALS
Filed Sept. 10, 1920

Witness: Arthur Thompson
Inventor: Samuel Scott Wilson

Patented July 29, 1924.

1,503,409

UNITED STATES PATENT OFFICE.

SAMUEL SCOTT WILSON, OF MEYERTON, TRANSVAAL, SOUTH AFRICA, ASSIGNOR TO JOHN WILSON AND SONS, LIMITED, OF JOHANNESBURG, TRANSVAAL, SOUTH AFRICA.

PROCESS OF MANUFACTURING TILES, SHEETS, AND OTHER ARTICLES OR PRODUCTS FROM ASBESTOS OR LIKE MATERIALS.

Application filed September 10, 1920. Serial No. 409,432.

*To all whom it may concern:*

Be it known that I, SAMUEL SCOTT WILSON, a subject of the King of Great Britain, and resident of Meyerton, Transvaal Province, Union of South Africa, have invented a certain new and useful Improvement in Processes of Manufacturing Tiles, Sheets, and Other Articles or Products from Asbestos or like Materials, of which the following is a specification.

The present invention relates to a process of manufacturing tiles, sheets, ridging, et cetera, for building and other purposes, lamp shades and other articles or products in which asbestos or like material is used as the chief component.

It is especially applicable to the manufacture of sheets, tiles or the like used as the walls of buildings, or for roofing or like purposes, and in which the asbestos or like material is bound or held together by Portland cement or other like cementitious material.

In manufacturing sheets, tiles, et cetera, of the kind specified, it has been found difficult to dry or extract the liquid or moisture from the sheets, et cetera, after the mixture of asbestos and cement has been moulded to the desired shape, and this has usually necessitated the employment of costly machinery to effect such drying.

Now the object of this invention is to devise a simple and efficient process or method of drying, or extracting the moisture from, the sheets, tiles, et cetera, which will obviate the use of such machinery and allow the sheets, tiles, et cetera, to be manufactured at a comparatively low cost.

The invention will be fully explained with the aid of the accompanying drawings, wherein is illustrated, by way of example, the practical application of the same to the manufacture of four different articles or products. In the drawings, Fig. 1 is a sectional side elevation of a suitable mould and means for use in my process of manufacturing sheets, et cetera, and Fig. 2 a plan view of the same.

Fig. 3 is a side elevation of a suitable mould and means for use in manufacturing tiles or the like.

Fig. 4 is a plan view of Fig. 3.

Figure 1:
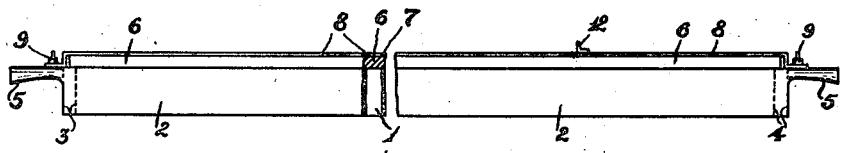
Figure 2:
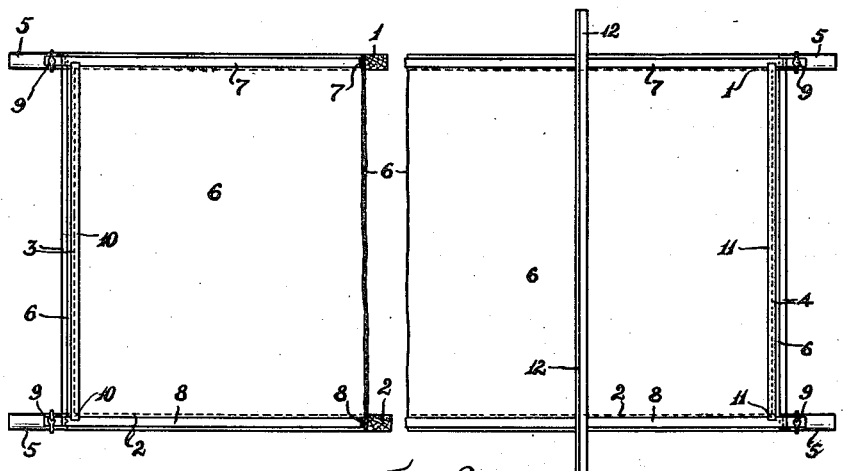

Referring to the embodiment illustrated in Figs. 1 and 2, representing the mould for forming and drying sheets or the like (which may be of any desired thickness), said mould includes a framework which comprises the longitudinal or side parts or members 1, 2, and the cross members 3, 4, at the ends, all of which framework may be made of wood, as shown, or any other suitable material. The ends of the side members 1, 2 are shown fashioned or provided with handles 5 for convenience in transporting the mould.

6 is a slab or palette which rests upon the framework and constitutes the bottom of the mould proper. This slab or palette 6 is made of an absorbent material or one capable of readily absorbing water. It is preferably made thick relative to the thickness of the sheet or tile which is to be formed thereon. According to my process I use slabs or palettes made of plaster of Paris (calcium sulphate) as these have been found to be very effective in drying the sheets, tiles, et cetera, or in absorbing the moisture therefrom.

Along the longitudinal edges of the slab 6, there are arranged bars or strips 7, 8 of metal or other suitable material, shown bent near the ends down the sides of the slab and fixed by thumbscrews or the like 9, to the handles 5. At the ends of the slab or palette 6, similar bars or strips 10, 11, are provided which, at their ends, fit recesses in the longitudinal bars 7, 8, so that they rest upon the slab 6 between the said bars 7, 8. The several bars or strips 7, 8, 10, 11, will ordinarily be of uniform thickness and, as they form the sides of the mould, their thickness will correspond to the thickness of the sheet which is to be formed upon the slab 6.

12 is a means, shown in the form of a bar of L section, to be used as a scraper for levelling off the material in the mould to the level of the said bars 7, 8, 10, 11.

In preparing the material which is to be used for manufacturing the sheets, the asbestos or the like is mixed with the cement and the requisite quantity of water to obtain a mixture of the desired consistency, which is preferably that of a pasty pulp or plaster. A coating of a thin or fluid mixture of French chalk, talc or the like and water is now applied to the surface of the slab 6 so that the water of the mixture is immediately absorbed, leaving the solid constituent of the mixture on the surface of the slab. A quantity of the asbestos or like mixture is now placed on the surface of the slab or palette and spread thereon and subsequently leveled by means of the bar 12, so that the sheet is of uniform thickness and of the thickness of the bars 7, 8, 10, 11. After the material has been on the slab for a short time and the moisture partially extracted from it and absorbed by the slab, the top of the sheet may, if desired, be further consolidated and smoothed by means of a trowel or otherwise.

The mass forming the sheet is then allowed to dry and harden in the mould for a period of say twenty-four (24) hours—more or less—after which the sheet is removed and placed in a tank of water where it is left for a suitable period of time, say one week, to "season." The sheet is then removed from the tank and suitably dried when it is ready for use.

If found necessary for any purpose, the sheets may be reinforced with metal or other preferred material.

Figures 3, 4:
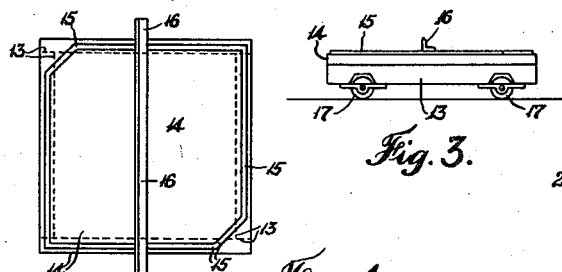

Referring to the construction of the mould illustrated in Figs. 3 and 4, for making roofing tiles and the like, 13 represents the framework of wood or other suitable material, 14 the slab or palette of plaster of Paris or like absorbent material and 15 a frame which serves as the sides of the mould and determines the thickness of the tile, et cetera. 16 is the bar for levelling off the material in the mould in the making of the tile, et cetera. This mould is shown mounted on wheels 17 to facilitate its being moved from place to place as may be desired.

Figures 5, 6:
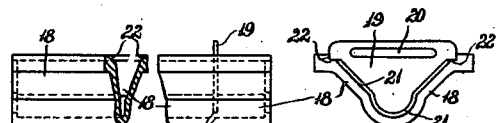
Fig. 5 is a side elevation of a suitable mould and means for manufacturing ridging for roofs, et cetera.
Fig. 6 is an end elevation of Fig. 5.

Referring to the mould for making the ridging, shown in Figs. 5 and 6, 18 represents the internally appropriately shaped part, made of plaster of Paris or the like, which forms the bottom of the mould. 19 is the means in the form of a suitably shaped tool or scraper for levelling the material in the mould, it being slotted at 20 to form a handle. The space 21, in Fig. 6, will represent the thickness of the ridging made in the mould. The part 18 is shown grooved or recessed along the edges at 22 to guide the scraper.

Figure 7:
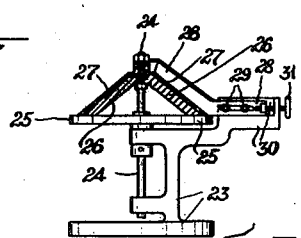
Fig. 7 is a part sectional elevation of a suitable mould and means for making lamp shades and articles of similar shape.
Figure 8:
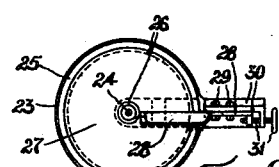
Fig. 8 is a plan view of Fig. 7.

In Figs. 7 and 8, showing the means for making lamp shades or like articles, 23 represents a standard or support carrying a vertical spindle 24 on which is mounted a disc or table 25. On the upper end of the spindle 24, and resting upon the disc or table 25, is a conical part 26, made of plaster of Paris or the like which forms the bottom of the mould on which the shade 27 is moulded. 28 represents an inclined scraper the edge of which is parallel with the side of the cone 26 and serves to make the shade of uniform thickness. The scraper 28 is shown adjustable, it being adjustably attached by bolts 29 to an extension 30 of the standard 23, 31 being an adjusting screw for adjusting the scraper 28, as desired, after the bolts have been loosened.

The manner of making the different articles with the moulds illustrated in Figs. 3 and 4, 5 and 6, and 7 and 8, will be readily understood from the description of the method of operation of the mould illustrated in Figs. 1 and 2.

It is to be understood that the process according to the invention may be adapted for the manufacture of any other articles or objects in which cement asbestos or equivalent mixtures are employed, and with which water is used as the medium for mixing the ingredients thereof, and the excess of which water it is requisite or necessary to remove quickly from the mixture as the material sets.

What I claim as my invention and desire to protect by Letters Patent is:—

1. The process of manufacturing sheets from a plastic mixture of asbestos, cement and water, which consists in spreading the mixture upon a surface provided by a slab made of plaster of Paris, as set forth.

2. The process of manufacturing sheets from a plastic mixture of asbestos, cement and water, which consists in spreading the mixture upon a surface provided by a slab made of plaster of Paris to which a coating of French chalk has been applied, as set forth.

3. The process of manufacturing sheets from a plastic mixture of asbestos, cement and water, which consists in spreading the mixture upon a surface provided by a slab made of plaster of Paris and thereafter applying pressure to the surface of the mixture to consolidate it, as set forth.

In testimony whereof I have signed my name to this specification in the presence of two subscribing witnesses.

SAMUEL SCOTT WILSON.

Witnesses:
V. WESTON,
PAUL S. GUINN.